Nov. 20, 1956 J. J. KORWIN 2,771,320
SPRINKLING SYSTEM
Filed Nov. 4, 1952 2 Sheets-Sheet 1

INVENTOR
John J. Korwin.
BY
Robert E. Harris.
ATTORNEY

Nov. 20, 1956  J. J. KORWIN  2,771,320
SPRINKLING SYSTEM

Filed Nov. 4, 1952  2 Sheets-Sheet 2

INVENTOR
John J. Korwin
BY
Robert E. Harris
ATTORNEY

United States Patent Office 2,771,320
Patented Nov. 20, 1956

2,771,320

SPRINKLING SYSTEM

John J. Korwin, St. Clair Shores, Mich.

Application November 4, 1952, Serial No. 318,575

12 Claims. (Cl. 299—104)

This invention relates to an improved sprinkling device and this application is a continuation in part of my pending application Serial No. 189,367, filed October 10, 1950 now abandoned.

More particularly the invention pertains to an improved sprinkling device for lawns, gardens and the like.

One of the main objects of the invention is to provide sprinkling apparatus of this kind which discharges a mist like spray of water that is sufficiently finely divided to thoroughly wet, rather than run off of the ground and vegetation to which it is applied.

Another object of the invention is to provide a sprinkling device of this kind which simultaneously and uniformly applies a mist like discharge of water upon all portions of a relatively large area of ground and vegetation with the aid of a comparatively low pressure household water supply system.

A further object of the invention is to provide a universally flexible and adjustable device of this kind which can be readily selectively arranged to uniformly sprinkle plots of ground and vegetation of diverse sizes and shapes.

A still further object of the invention is to provide a sprinkling system of this kind in which the degree of fineness of the streams discharged can be predetermined by control of the water pressure applied.

Still further objects of the invention are to provide a hose type sprinkling system in which free expansion of minute apertures in selected portions of the wall of a hose is relied upon to discharge mist like streams of water in selected directions, to provide a hose with an expansible wall consisting of unreinforced plastic, and to provide a hose of this kind which has a relatively flat base portion that is adapted to support the hose on the ground or other surfaces with the apertured wall portion of the hose selectively directed for discharging water upwardly and outwardly.

Additional objects of the invention are to provide in a hose type sprinkling system of this kind a plurality of self-restricting, slit and/or puncture type outlet orifices, and to provide a gradually increasing number of such outlet orifices in adjacent sections of the hose of a sprinkling system which are successively more remote from the connection thereof to a source of water pressure in order to approximately equalize the quantities of water discharged by such adjacent hose sections even though the water pressure gradually drops progressively throughout the length of the hose.

An illustrative embodiment of the invention is shown in the accompanying drawings in which.

Figure 1:
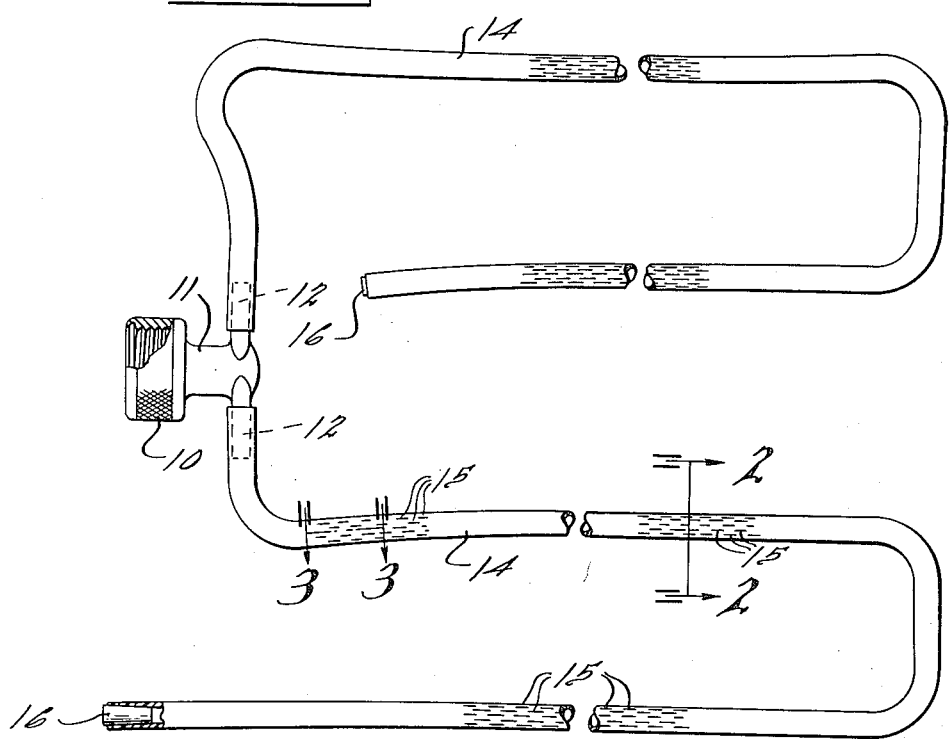
Fig. 1 is a fragmentary plan view of a sprinkling system embodying my invention.
Figure 2:
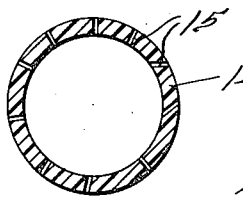
Fig. 2 is a transverse sectional view taken on line 2—2 of Fig. 1.
Figure 3:
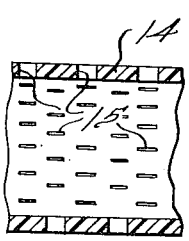
Fig. 3 is a fragmentary longitudinal view taken on the line 3—3 of Fig. 1.

In the form of the invention shown in Figs. 1, 2 and 3 of the drawings, my improved sprinkling device, which is particularly suitable for sprinkling lawns and other plots of vegetation, comprises a metal fixture 10 of the type generally used for detachably connecting a garden hose to a spicket. The fixture 10 has a tubular body portion 11 from which tubular stems 12 and 13 extend outwardly in respectively opposite directions. Fitted on each of the stems 12 and 13 is a length of flexible hose 14 of circular cross section which is slightly expansible circumferentially under pressures of a value normally used in household plumbing systems.

The hose 14 is preferably of uniform composition and is entirely free from cord fabric or other reinforcement tending to confine it against such expansion. It may be formed of vinyl chloride, acetate, copolymers or other synthetic resin compounds, many of which are now used in the manufacture of garden hose which is at present on the market. While synthetic resin compounds are preferred, natural rubber containing compounds may also be used provided the material produces a hose which will expand sufficiently under household water pressures to accomplish the purpose hereinafter set forth. While the hose may be of any conventional garden hose diameter, it is preferable, in many installations, to employ plastic hose of ¾ to ¼ of an inch. In many applications ½ inch diameter hose is preferred.

Each length of hose 14 is provided with a multiplicity of closely arranged discharge orifices 15 which are normally of such dimensions as to substantially be self-sealing until internal fluid pressure is applied in the hose. In order to build up sufficient pressure to expand the hose and thus slightly enlarge the orifices, a plug 16 is inserted in the free end of each length of hose 14 in order to prevent free flow of liquid therefrom. As will be seen from Figs. 2 and 3, the orifices 15 are preferably of slit-like formation and contour for they are substantially longer than they are wide and their longitudinal dimensions extend lengthwise of the hose sections.

The discharge orifices are wholly bounded and restricted by the resiliently yieldable material of the hose and no provision is made for mechanically spreading the orifices other than by internal pressure of liquid in the interior of the hose sections. As a result of this construction and the small size and dimensions of the discharge apertures, a mist-like spray is discharged by the orifices 15. This spray is so fine that it uniformly wets the vegetation and ground to which it is applied and does not merely run off of it into natural or artificial drainage systems adjacent the plot of ground to which it is applied. A considerable saving in spray liquid, which usually comprises water, is thus effected and that water which is discharged by the sprinkling system is efficiently used. The flexible hose may be readily placed in any desired configuration to conform to the shape and contour of the plot of ground being sprinkled and the spread of the spray may be somewhat controlled by varying the pressure and quantity of water fed into the fixture 10 from a normal household spigot. The discharge orifices are preferably formed by piercing or slitting operations in order that material of the hose is not removed as in punching operations so that the apertures will be self-sealing to the extent that they tend to remain closed until the predetermined internal liquid pressure is applied in the interior of the hose. A hose of circular cross section, such as shown in Figs. 1, 2 and 3, may be provided with discharge apertures at selected locations or uniformly distributed throughout its entire length and circumference as illustrated. In the latter case, some of the liquid is discharged directly upon the ground without being projected into the air either sidewise or upwardly. Normal household water pressures are sufficient to produce a mist-like spray in the areas adjacent the hose. While such household water pressures frequently vary with water demand, they are generally between 30 and 40 pounds per square inch.

Figure 4:
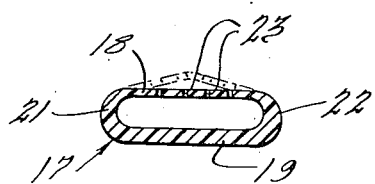
Fig. 4 is a transverse sectional view similar to Fig. 2 but showing a modified form of the invention.

In the form of the invention shown in Fig. 4 the hose, generally designated by the numeral 17, is substantially the same construction and comprises the same material as specified in connection with the hose illustrated in Figs. 1, 2 and 3 but the cross sectional contour of the embodiment shown in Fig. 4 is different from that shown in Figs. 1, 2 and 3. In Fig. 4 is illustrated a hose 17 which is of flat elliptical shape having upper and lower spaced, substantially parallel side walls 18 and 19, respectively, which are connected by arcuate end wall sections 21 and 22. In this form of the invention discharge apertures 23 which are also of slit-like contour and which preferably have their lengths extending longitudinally of the hose are formed only in the upper side wall 18 of the hose and the lower side 19 which may be thicker than the upper side, if desired, is impervious and thus serves as a continuous base to position the apertured side wall of the hose upwardly. When the hose shown in Fig. 4 is placed under internal pressure by supplying water or other liquid to it under normal household water pressure, the upper side wall expands upwardly somewhat causing the slit-like discharge apertures 23 to open sufficiently to permit a mist-like spray discharge similar to that described in connection with the description of Figs. 1 to 3. The main advantage of this form of hose is that water is not permitted to flow directly from the interior of the hose to the ground but the entire discharge is forced upwardly in a mist-like spray in order that it may effectively fall upon the vegetation and ground to which the spraying device is applied.

Figure 5:
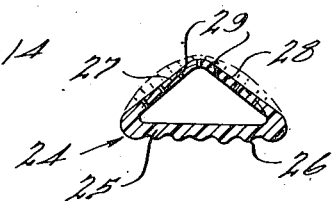
Fig. 5 is a transverse sectional view similar to Fig. 2 but showing a further form of the invention.

In the form of the invention shown in Fig. 5, the hose, generally designated by the numeral 24, comprises material similar to that of the hose shown in Figs. 1, 2, 3 and 4 but it has a triangular rather than a circular or oblong cross section. The hose shown in Fig. 5 has a base portion or lower wall 25 on which ridges 26 are provided to more securely hold the hose against unintended movement upon shifting on the ground. The upper wall of the hose shown in Fig. 5 comprises upwardly converging, angularly disposed wall sections 27 and 28 which are provided with slit-like discharge apertures 29 corresponding in shape, contour and construction with the apertures of the hose embodied in Figs. 1 to 4. When the interior of the triangular hose shown in Fig. 5 is placed under pressure, the upward walls are bound slightly outwardly thus causing enlargement of the discharge orifices 29 to enable the formation of the mist-like spray discharging action of the character heretofore described.

Figure 6:
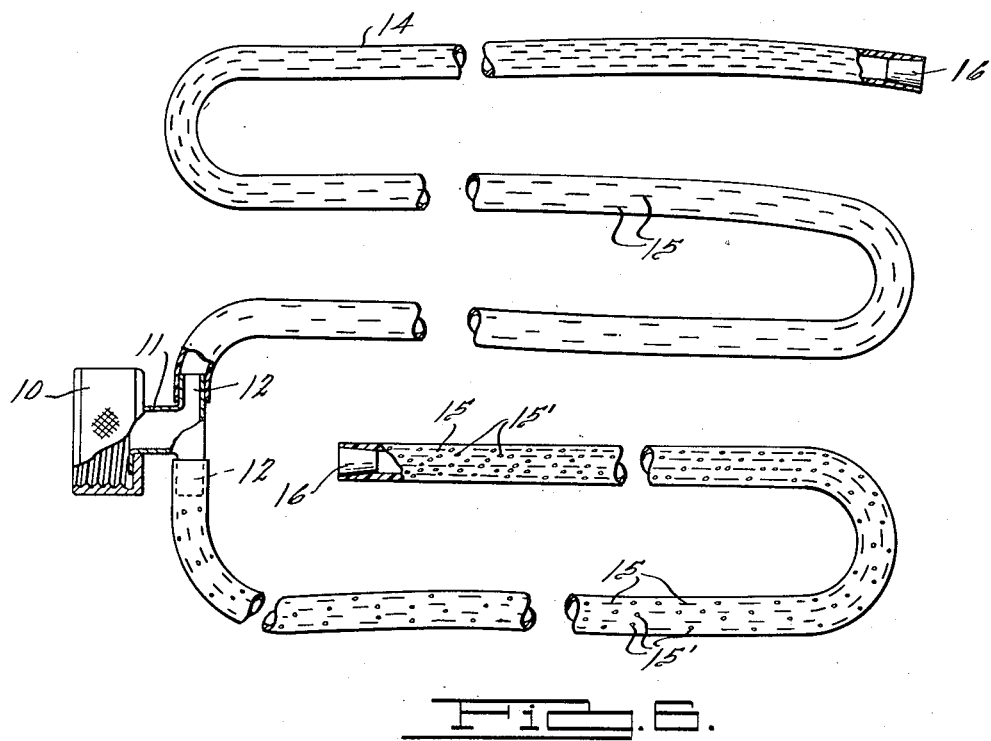
Fig. 6 is a fragmentary plan view, similar to Fig. 1 but showing another modification of the invention.

In the form of the invention shown in Fig. 6, the sprinkling system is basically identical to the system shown in Fig. 1 and corresponding portions of the structure are designated by the same numerals. However, in the upper length of hose shown in Fig. 6, there are provided only slit-like orifices 15, the concentration of which varies in the adjacent sections of the hose. The number of slit-like orifices per unit of length of hose is progressively greater in the sections of the hose 14 which are successively more remote from the fixture 10. The variation in number of outlet orifices is preferably predetermined to approximately equalize the quantity of water discharged from adjacent sections of the hose which are subjected to progressively decreasing pressures as water is sprayed from preceding hose sections.

In the lower length of hose shown in Fig. 6, there are provided a mixture of slit-like orifices 15 and generally round puncture type, self-restricting orifices 15'. The orifices 15 and 15' are distributed as in the upper length of hose so as to substantially equalize the quantity of liquid discharged by successively adjacent sections of the length of hose. The puncture type orifices 15' may be formed as hereinafter set forth in the discussion of Fig. 7.

Figure 7:
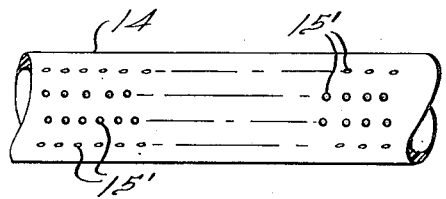
Fig. 7 is a fragmentary, enlarged plan view of a section of hose of a sprinkling system embodying a further modification of the invention.

In Fig. 7 is illustrated a fragment of hose 14 in which are provided puncture type, self-restricting orifices 15' which are generally round in shape and similar to those shown in the lower length of hose shown in Fig. 6. The orifices 15' may be formed by piercing the wall of the hose with a sharp pointed needle like instrument or fine drill which will produce a puncture-type orifice that expands when the hose is subjected to internal pressure such as that of a household water system. While the slit-like orifices of Figs. 1 to 6 are preferred, satisfactory mist-like sprays can be produced by a hose 14 having puncture type generally rounded orifices. The later type of orifices tend to become sealed closed during periods of non-use much more readily than do the slit-like orifices but the puncture type orifices may be unsealed by stretching the hose after a period of non-use and before subjecting it to internal water pressure. When the same length of hose is provided with a mixture of slit-like orifices 15 and puncture type orifices 15', the slit-like orifices 15 may be relied upon to discharge mist-like sprays of liquid at one range of pressure in the hose and the puncture type orifices may be relied upon to discharge mist-like sprays of liquid at a higher range of pressure. Where only puncture type orifices are provided in the hose, the pressure can be advantageously increased substantially above that required when only slit-like orifices 15 are provided in the hose.

It will be seen that the sprinkling device is not only inexpensive but a small amount of hose included in it may be utilized to effectively sprinkle relatively large areas of diverse shapes without requiring continuous and repeated readjustment and repositioning, as is customary in the use of conventional spray devices.

Although but several specific embodiments of the invention are herein shown and described, it will be understood that various changes in the sequence of operations, steps and materials employed may be made without departing from the spirit of the invention.

I claim:

1. A sprinkling device including a fixture for communicative connection with a source of liquid under pressure, and an integral spray forming member comprising a flexible hose communicatively connected to said fixture having a main liquid passageway and including a wall portion comprising resiliently elastic material provided with a plurality of minute linear spray producing discharge orifices formed directly in said resiliently elastic material and extending transversely of the lateral cross section of said hose, the bounding walls of said discharge orifices comprising said resiliently elastic material and normally constricting said orifices while said hose is free from internal pressure, said orifice being expansible in response to internal pressure of liquid in said main passageway for emitting mist-like spray discharges therethrough.

2. A sprinkling device including a fixture for communicative connection with a source of liquid under pressure, an integral spray forming member comprising a flexible hose communicatively connected to said fixture having a main liquid passageway and including a wall portion comprising resiliently elastic material provided with a plurality of minute linear mist-like spray producing discharge orifices formed directly in said resiliently elastic material and extending lengthwise of said hose in a direction transverse to its curvature, the bounding walls of said discharge orifices comprising said resiliently elastic material and normally constricting said orifices while said hose is free from internal pressure, said orifice being expansible in response to internal pressure of liquid in said main passageway and means substantially completely obstructing said main passageway at a location in said hose on the down stream side of said orifices.

3. A sprinkling device comprising a length of flexible hose having a freely expansible integral wall structure formed of resiliently elastic plastic compound, said wall structure being free from expansion opposing reinforcement and having a multiplicity of linear mist-like spray discharging orifices bounded and yieldably restricted by said resiliently elastic plastic compound.

4. A sprinkling device comprising a length of flexible hose having a freely expansible integral wall structure of single curvature formed of resiliently elastic plastic compound, said wall structure being free from expansion opposing reinforcement and having a multiplicity of mist-like spray producing orifices bounded and yieldably restricted by said resiliently elastic plastic compound and extending transversely of the curvature of said wall structure, means at one end of said hose for connecting it with a source of liquid under pressure, and means at the opposite end portion of said hose for obstructing free lengthwise flow of liquid therethrough.

5. A sprinkling device comprising a length of flexible hose having a freely expansible integral wall structure formed of resiliently elastic plastic compound, said wall structure being of cylindrical shape and being free from expansion opposing reinforcement and having a multiplicity of linear mist-like spray discharging orifices of slit-like formation extending lengthwise of said hose and bounded and yieldably restricted by said resiliently elastic plastic compound.

6. A sprinkling device comprising a length of flexible hose having a substantially flat wall portion adapted to serve as a supporting base and including an adjacent freely expansible integral wall portion formed of resiliently elastic plastic compound, said latter wall portions having a multiplicity of linear mist-like spray discharging orifices extending longitudinally of said hose and bounded and yieldably restricted by said resiliently elastic plastic compound, said orifices having substantially rectangular opposite bounding sides normally urged together.

7. A sprinkling device comprising a length of flexible hose having a substantially flat wall portion adapted to serve as a supporting base and including a pair of transversely adjacent converging freely expansible wall portions formed of resiliently elastic plastic compound, said latter wall portions having a mutiplicity of linear mist-like spray discharging orifices bounded and yieldably restricted by said resiliently elastic plastic compound and extending substantially parallel to the intersection of said converging wall portions.

8. A sprinkling device comprising a length of flexible hose having a cross section of generally flat, oval contour including spaced parallel main top and bottom wall sections and arcuate end wall sections, said top wall section comprising substantially freely expansible resiliently elastic plastic compound and having a mutiplicity of mist-like spray discharging orifices bounded and yieldably restricted by said resiliently elastic plastic compound, said bottom wall section being adapted to serve as a supporting base and advantageously position said top wall section for directing spray discharge.

9. A sprinkling device comprising a length of flexible hose having a freely expansible integral wall structure formed of resiliently elastic plastic compound, said wall structure having a multiplicity of expansible, self-restricting, mist-like spray producing orifices bounded and yieldably restricted by said resiliently elastic plastic compound, inlet means at one end of said length of hose for connecting it to a source of liquid under pressure, the number of said orifices in longitudinally adjacent sections of said length of hose being progressively greater in the sections of said hose which are successively more remote from said inlet means, and means at the other end of said hose for obstructing free length-wise flow of liquid therethrough.

10. A liquid spray sprinkling device comprising a length of flexible hose having an expansible, homogeneous, wall structure formed of a resiliently elastic compound, said wall structure having integrally formed therein and closely spaced lengthwise of and circumferentially about the hose a plurality of puncture type, expansible, self restricting, liquid spray producing orifices that are bounded and yieldably restricted by only the adjacent resiliently elastic compound of the hose wall structure.

11. A liquid spray sprinkling device comprising a length of flexible hose having an expansible, homogeneous, wall structure formed of a resiliently elastic compound, said wall structure having integrally formed therein and closely spaced lengthwise of and circumferentially about the hose a plurality of generally round, puncture type, expansible, self restricting, liquid spray producing orifices that are bounded and yieldably restricted by only the adjacent resiliently elastic compound of the hose wall structure, said hose having means permitting connection of the hose to a pressurized liquid source and means to trap pressurized liquid within said hose length.

12. A liquid spray sprinkling device comprising a length of flexible hose having an expansible, homogeneous, wall structure formed of a resiliently elastic compound, said wall structure having integrally formed therein and closely spaced lengthwise of and circumferentially about the hose a plurality of puncture type, expansible, self restricting, liquid spray producing orifices that are bounded and yieldably restricted by only the adjacent resiliently elastic compound of the hose wall structure, said orifices extending throughout a substantial portion of the length of the hose.

References Cited in the file of this patent

UNITED STATES PATENTS

| | | |
|---|---|---|
| 818,938 | Crane | Apr. 24, 1906 |
| 1,520,048 | Baird | Dec. 23, 1924 |
| 2,392,085 | Ferrel | Jan. 1, 1946 |
| 2,563,300 | Aker | Aug. 7, 1951 |
| 2,598,035 | Bulkley | May 27, 1952 |